INVENTORS
MAURICE GAUTHRON
CLAUDE BEERNAERT

BY Cameron, Kerkam & Sutton
ATTORNEYS

Sept. 11, 1962 M. GAUTHRON ETAL 3,053,976
METHODS AND APPARATUS FOR SHEATHING
Filed Dec. 16, 1958 4 Sheets-Sheet 3

INVENTORS
MAURICE GAUTHRON
CLAUDE BEERNAERT
BY Cameron, Kerkam & Sutton
ATTORNEYS

United States Patent Office 3,053,976
Patented Sept. 11, 1962

3,053,976
METHODS AND APPARATUS FOR SHEATHING
Maurice Gauthron, Paris, and Claude Beernaert, Lille, Nord, France, assignors to Commissariat a l'Énergie Atomique, Paris, France, a company of France
Filed Dec. 16, 1958, Ser. No. 780,819
7 Claims. (Cl. 219—149)

The present invention relates to methods of sheathing and to the apparatus employed for sheathing.

The methods of sheathing of the present invention are essentially characterized by the deformation and the drawing of the sheath without deformation of the element being sheathed with the application of the sheath onto the element to be sheathed by heat and pressure by passage through a drawplate of suitable diameter, where means for heating the sheath and the element to be sheathed are located while conducting the drawing operation under a controlled atmosphere or under a vacuum and introducing between the sheath and the element to be sheathed a liquid or a solid as required to act as an intermediary of diffusion or to break oxide layers which may be present.

Various methods of sheathing now known are applicable only to particular cases and cannot be employed for certain types of sheathing. The following known methods of sheathing may be mentioned:

Coextrusion, or combined cabling of the sheath and the element to be sheathed but this method does not permit the employment of an intermediate layer between the sheath and the element to be sheathed.

Application of the sheath onto the element to be sheathed by hydrostatic pressure while heated but this method does not permit dissolving of any oxide layer on the sheath and excludes certain diffusions at high temperature.

In carrying out the method of sheathing of the present invention the sheath and the element to be sheathed are readied before the sheath is applied onto the element to be sheathed. The element to be sheathed is not deformed during the sheathing operation. The sheath, however, is subjected to a considerable plastic deformation while heated and may be lengthened by 30%. This lengthening of the sheath has the advantage of breaking the oxide layer covering the interior of the sheath and of preventing intermetallic diffusion between the sheath and the element to be sheathed.

In a preferred embodiment of the invention the heating of a cylindrical bar to be sheathed is obtained by a high frequency heating-coil placed just ahead of the drawplate and advance of the bar and of the sheath through the drawplate is obtained by a screw jack exerting pressures on the order of several tons.

In another embodiment of the invention two drawplates are employed for the sheathing of a bar, a predrawplate and a shaping drawplate; heating is provided by low tension electric current and the electric current is applied through the predrawplate. If it is desired to heat the bar, the return of the electric current can be made through the predrawplate and the bar. The electric current for heating may be either direct or alternating current. Advance of the bar through the drawplates is obtained by a hydraulic jack.

In another embodiment of the invention sheathing of a hollow cylindrical bar is obtained. Exterior sheathing is preformed as described with an exterior drawplate. Interior sheathing is performed by a shaper placed within the tube and within the exterior drawplate. Electric current is supplied through the drawplate with return through the shaper and through the bar. The shaper may be cooled by circulation of water. Advance of the bar is caused by a hydraulic jack or by a screw.

In another embodiment of the present invention the sheathing of plates is performed by means of a rolling mill. Here heating is obtained by low tension electric current. The current is introduced through the rolls of the rolling mill, and returns through the plate being sheathed.

Heating with low tension electric current is used for all forms of drawplates, while heating with high frequency electric current is used only for sheathing cylindrical bars. Sharp constriction of the sheath on the bar after cooling is obtained by the present invention.

Referring now to the accompanying drawings, in which like reference characters indicate like parts, the illustrative embodiments of the present invention there shown are not to be regarded as limiting the new methods of sheathing and the apparatus of the present invention. The embodiments of the invention which will be described hereinafter should be regarded as constituting a part of the invention, it being understood that any equivalent arrangement may also be employed without departing from the scope of the invention.

Figure 1:
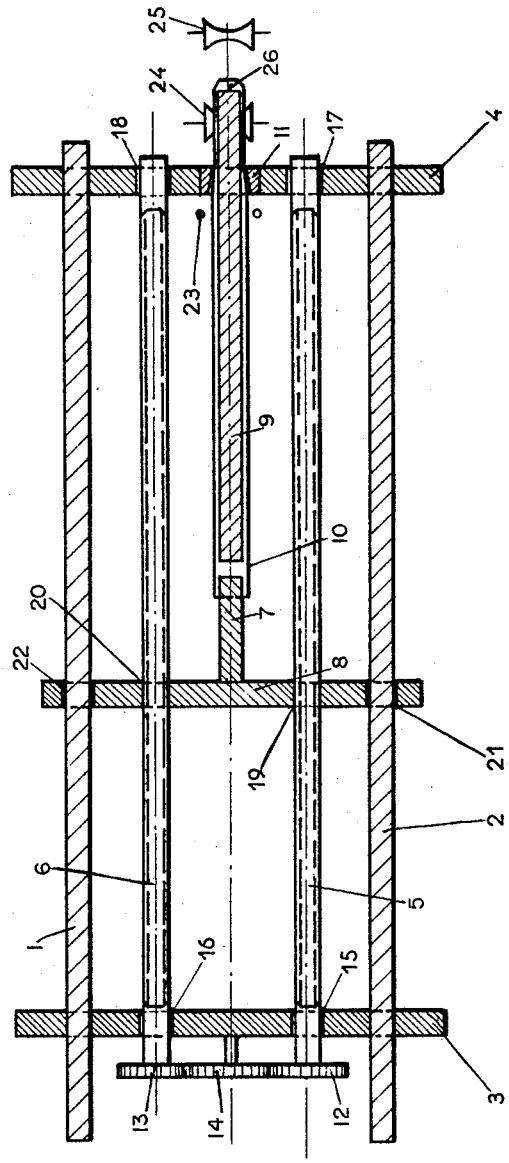
FIG. 1 is a sectional view from above of sheathing apparatus according to the present invention for sheathing bars.

In FIG. 1 the apparatus includes stringers 1 and 2 with crosspieces 3 and 4 constituting the frame of the machine. Endless screws 5 and 6 are mounted in crosspieces 3 and 4. Piston 7 is mounted on support 8 which is mounted on stringers 1 and 2 and is moved by screws 5 and 6. Piston 7 moves bar 9, sheath 10 through the drawplate 11. The rotation of endless screws 5 and 6 is obtained by the gears 12 and 13, mounted thereon which mesh with gear 14. Gear 14 is rotated by a variable-speed motor reducer system, not shown. Screws 5 and 6 turn freely in bearings 15, 16, 17 and 18, respectively, provided, respectively, in crosspieces 3 and 4. Support 8 is advanced by threads 19 and 20. Openings 21 and 22 in crosspiece 8 guide crosspiece 8 on stringers 1 and 2. High frequency electric heating is provided by coil 23. Drawplate 11 is rigidly fastened on crosspiece 4. After leaving drawplate 11 sheathed bar 9 is maintained horizontal by rollers 24 and 25. Introduction of the end 26 of the sheath 10 into drawplate 11 is facilitated by reducing its diameter.

In the embodiment of FIG. 1 the pressure exerted by screws 5 and 6 is between 3 and 4 tons. The drawplate may have a diameter of 20 to 30 mm. and the drawing ratio is between 1 and 1.5.

Figure 2:
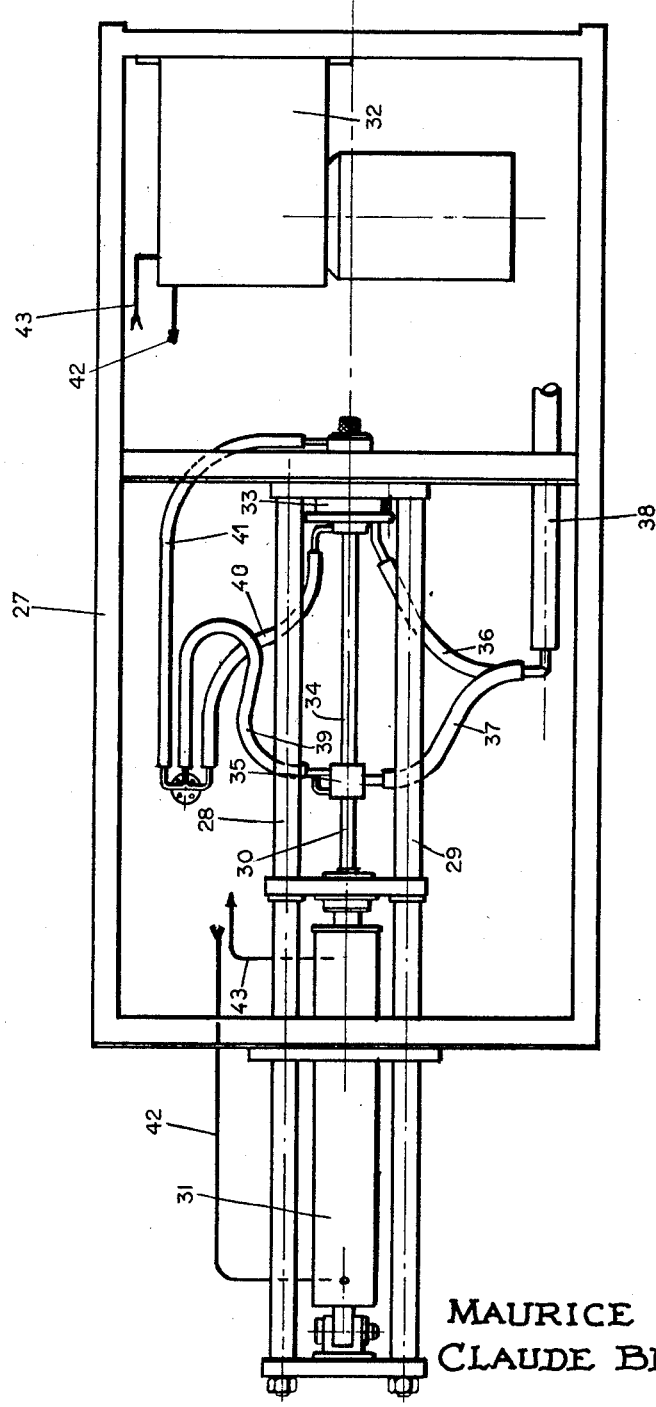
FIG. 2 is a view from above of other sheathing apparatus according to the present invention.

In FIG. 2 frame 27 carries the sheathing apparatus and its accessories, including slideways 28 and 29 which guide piston 30 of the double-acting jack 31, hydraulic pump 32 which actuates jack 31, the drawplate assembly 33, sheath 34, assembly 35 for sheath 34 and piston 30, vacuum lines 36, 37 and 38, lines 39, 40 and 41, for an inert gas such as argon and the hydraulic lines 42 and 43.

Figure 3:
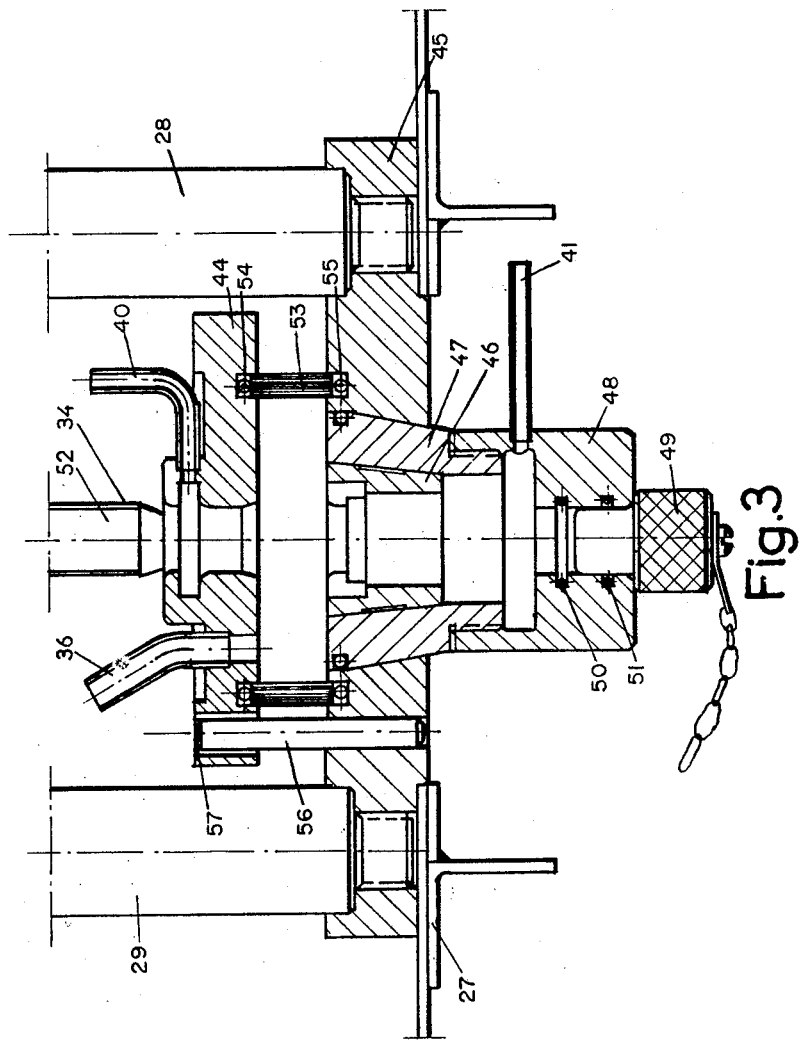
FIG. 3 is a sectional view of the drawplates of the embodiment of FIG. 2.

FIG. 3 shows in section the drawplate assembly 33. This assembly includes a predrawplate 44, a drawplate support 45, a shaping drawplate 46 and its assembly cone 47 to receive drawplates of various diameters and exit piece 48 with stopper 49 sealed by gaskets 50 and 51. The bar being sheathed is shown at 52. A ring 53 forms a hermetic chamber between drawplate support 45 and predrawplate 44 and is sealed with respect thereto by gaskets 54 and 55. Guide shafts spaced at 120° angles, one of which is shown at 56, center predrawplate 44 with reference to shaping drawplate 46. Guide shafts 56 are insulated at 57 from predrawplate 44.

Figure 4:
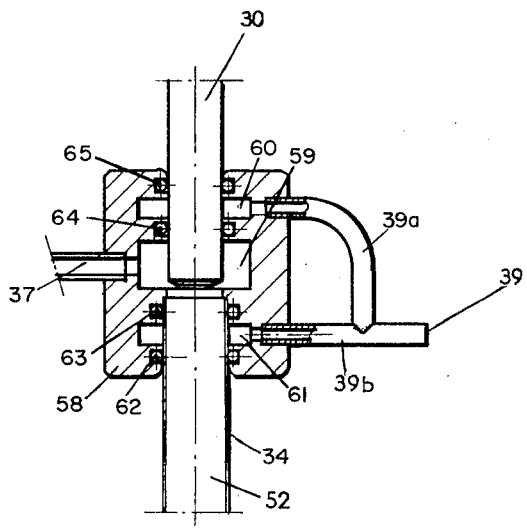
FIG. 4 is a sectional view of the piston-sheath assembly of the embodiment of FIG. 2.

In FIG. 4 a section of the assembly 35 for piston 30 and sheath 34 is shown. This assembly includes a cylindrical sleeve 58 which surrounds piston 30 and sheath 34. Three chambers 59, 60 and 61 are provided within sleeve 58. Chamber 59 is connected to vacuum line 37, and chambers 60 and 61 are connected, respectively, with the lines 39a and 39b for an inert gas such as argon. Gaskets 62, 63, 64 and 65 form air tight joints with piston 30 and sheath 34 respectively.

When sheathing in a vacuum the method is as follows: bar 52 is placed in sheath 34, one end thereof being closed or with reduced diameter for easy engagement in predrawplate 44, as seen in FIG. 3. Piston 30 is moved into assembly 58 and through gasket 65 but not through gasket 64, sheath 34 likewise extending through gasket 62 but not through gasket 63. A vacuum is then drawn through line 37 in the three chambers 59, 60 and 61 and in the space between sheath 34 and bar 52. The vacuum is then broken by the admission of an inert gas such as argon into chambers 60 and 61 at a pressure greater than atmospheric pressure thus introducing argon into chamber 59, and hence between sheath 34 and bar 52. Piston 30 is then moved through gasket 64 and sheath 34 is moved through gasket 63.

Then, with stopper 49 in place and sheath 34 engaged in predrawplate 44, a vacuum is drawn through line 36 in the chamber formed by predrawplate 44, ring 53, drawplate 46 and exit piece 48. An inert gas such as argon is then introduced through lines 40 and 41 creating an argon atmosphere preventing oxidation.

Sheathing is now started and electric current is fed through shaping drawplate 46 and drawplate support 45, with return through predrawplate 44, insulation 57 preventing a short circuit between the drawplates. Electric current may be supplied by a low tension transformer, not shown, which produces 2000 to 3000 amperes at 2 volts.

Hydraulic jack 31 should provide a maximum pressure of 10 tons for sheathing at the rate of 20 to 100 cm./minute.

The diameter of the drawplates may range from 20 to 30 mm. with a drawing ratio of between 1 and 1.5.

If a sodium film is desired between sheath 34 and bar 52 the method of the invention is as follows: sodium chips are introduced ahead of bar 52 into the end of sheath 34. The interior of the sheath having been purged of air, as described above, the sodium is melted by heating predrawplate 44 and the melted sodium ascends between the sheath and the bar.

Figure 5:
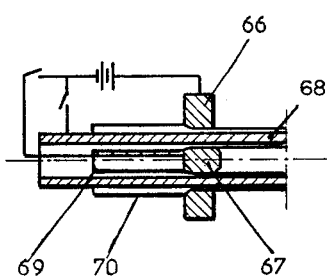
FIG. 5 is a sectional view of sheathing apparatus for sheathing the interior and exterior of hollow tubes.

In FIG. 5 the drawplate is shown at 66, the shaper at 67, the tube at 68, the interior sheath at 69 and the exterior sheath at 70.

Electric current is fed through drawplate 66 and the circuit is completed through shaper 67 or through shaper 67 and shaper bar 69. If necessary shaper 67 may be cooled by a circulation of water.

Changes in or modifications to the above described illustrative embodiments of the present invention may now be suggested to those skilled in the art without departing from the present inventive concept. Reference should therefore be had to the appended claims to determine the scope of the invention.

What is claimed is:
1. In an apparatus for sheathing, the combination of a drawplate, means for advancing the sheath and the element to be covered through said drawplate to reduce the diameter of the sheath and to apply the sheath by deformation thereof onto the element to be covered without deforming the element to be covered, means for selectively heating the sheath and the element to be covered and conduit means communicating with the space between the sheath and the element for placing the element to be covered selectively under a vacuum and an inert atmosphere.

2. Apparatus as described in claim 1 in which a jack moves the sheath and the element to be covered through said drawplate.

3. Apparatus as described in claim 1 in which said drawplate for reducing the diameter of the sheath and for applying the sheath by deformation onto the element to be covered without deforming the element to be covered includes a predrawplate and a drawplate having a smaller diameter than that of the drawplate but having a diameter greater than the diameter of the element to be covered and less than the sum of the diameters of the sheath and of the element to be covered.

4. Apparatus as described in claim 1 in which the assembly for reducing the diameter of the sheath and for applying the sheath by deformation onto the plate to be covered without deformation of the element to be covered includes rolls spaced apart by an amount greater than the thickness of the plate to be covered but less than the sum of the thicknesses of the plate to be covered and of the sheath.

5. In apparatus as described in claim 1, a high frequency electric heating coil for heating the sheath and the elements to be covered located immediately before said drawplate for reducing the diameter of the sheath.

6. Apparatus as described in claim 3 in which the means for heating the sheath and the element to be covered is a circuit for low tension electric current passing through the drawplate and returning through the predrawplate.

7. Apparatus as described in claim 1 in which the means for selectively placing the element to be covered under vacuum and under a controlled atmosphere includes the sheath closed at one end, a clamping sleeve forming an air-tight connection with the other extremity of the sleeve and with the means for advancing the sheath and the element to be covered, and a source of vacuum and a source of an inert gas connected to said sleeve whereby a space is provided between the sheath and the element to be covered in which a vacuum and a controlled atmosphere may be selectively drawn.

References Cited in the file of this patent

UNITED STATES PATENTS

| | | |
|---|---|---|
| 273,217 | Bacon | Feb. 27, 1883 |
| 310,805 | Ells | Jan. 13, 1885 |
| 460,921 | Meyer | Oct. 6, 1891 |
| 486,626 | Burton et al. | Nov. 22, 1892 |
| 1,169,819 | Henderson | Feb. 1, 1916 |
| 1,187,275 | Derihon | June 13, 1916 |
| 2,335,165 | Westin et al. | Nov. 23, 1943 |
| 2,374,794 | Westin | May 1, 1945 |
| 2,507,825 | Smith | May 16, 1950 |
| 2,647,981 | Wogerbauer | Aug. 4, 1953 |
| 2,705,275 | Westin et al. | Mar. 29, 1955 |
| 2,716,275 | Matthysse | Aug. 30, 1955 |

UNITED STATES PATENT OFFICE
CERTIFICATE OF CORRECTION

Patent No. 3,053,976                                   September 11, 1962

Maurice Gauthron et al.

It is hereby certified that error appears in the above numbered patent requiring correction and that the said Letters Patent should read as corrected below.

Column 4, line 21, for "drawplate" read -- predrawplate --.

Signed and sealed this 12th day of February 1963.

(SEAL)
Attest:

ERNEST W. SWIDER
Attesting Officer

DAVID L. LADD
Commissioner of Patents